United States Patent
Diedrich et al.

(10) Patent No.: US 12,002,098 B2
(45) Date of Patent: Jun. 4, 2024

(54) SYSTEM AND METHOD FOR SECURE INFORMATION VALIDATION AND EXCHANGE

(71) Applicant: Covered Insurance Solutions, LLC, Denver, CO (US)

(72) Inventors: Ross Diedrich, Rapid City, SD (US); Christopher Diedrich, Englewood, CO (US); Jonathan Baughn, Denver, CO (US); Reyna Delogé, Denver, CO (US); Robert Hajek, Denver, CO (US)

(73) Assignee: Covered Insurance Solutions, LLC, Denver, CO (US)

( * ) Notice: Subject to any disclaimer, the term of this patent is extended or adjusted under 35 U.S.C. 154(b) by 213 days.

(21) Appl. No.: 16/608,983

(22) PCT Filed: Apr. 26, 2018

(86) PCT No.: PCT/US2018/029581
§ 371 (c)(1),
(2) Date: Oct. 28, 2019

(87) PCT Pub. No.: WO2018/200819
PCT Pub. Date: Nov. 1, 2018

(65) Prior Publication Data
US 2020/0058073 A1    Feb. 20, 2020

Related U.S. Application Data

(60) Provisional application No. 62/491,722, filed on Apr. 28, 2017.

(51) Int. Cl.
*G06Q 40/08* (2012.01)
*G06Q 10/087* (2023.01)
(Continued)

(52) U.S. Cl.
CPC .......... *G06Q 40/08* (2013.01); *G06Q 10/087* (2013.01); *G06Q 10/10* (2013.01); *G06Q 40/02* (2013.01); *G06Q 40/06* (2013.01); *G06Q 50/22* (2013.01)

(58) Field of Classification Search
CPC ...... G06Q 40/08; G06Q 10/087; G06Q 10/10; G06Q 40/02; G06Q 40/06; G06Q 50/22
See application file for complete search history.

(56) References Cited

U.S. PATENT DOCUMENTS

| | | | | |
|---|---|---|---|---|
| 4,858,121 A | * | 8/1989 | Barber | G07F 17/0014 |
| | | | | 705/40 |
| 5,499,325 A | * | 3/1996 | Dugan, Jr. | G09G 1/07 |
| | | | | 345/589 |

(Continued)

FOREIGN PATENT DOCUMENTS

| | | | | |
|---|---|---|---|---|
| CN | 102171716 A | | 8/2011 | |
| WO | WO-0184348 A2 | * | 11/2001 | ........... G06Q 10/087 |
| WO | WO-2011062817 A1 | * | 5/2011 | ............. G06Q 20/04 |

OTHER PUBLICATIONS

International Search Report and Written Opinion, PCT/US2018/029581, filed Apr. 26, 2018, 12 pages.

*Primary Examiner* — Jessica Lemieux
*Assistant Examiner* — Pierre L Maccagno
(74) *Attorney, Agent, or Firm* — Brownstein Hyatt Farber Schreck, LLP

(57) ABSTRACT

Systems including purpose-configured controllers that securely separate—functionally, structurally, or physically—data acquisition, validation, and aggregation operations from data distribution operations associated with completing and distributing an insurance application to insurance carriers.

4 Claims, 15 Drawing Sheets

(51) Int. Cl.
*G06Q 10/10* (2023.01)
*G06Q 40/02* (2023.01)
*G06Q 40/06* (2012.01)
*G06Q 50/22* (2018.01)

(56) References Cited

U.S. PATENT DOCUMENTS

| | | | | |
|---|---|---|---|---|
| 5,550,734 | A * | 8/1996 | Tarter | G06Q 40/02 705/2 |
| 8,170,932 | B1 * | 5/2012 | Krakowiecki | G06Q 40/12 705/30 |
| 8,484,052 | B2 * | 7/2013 | Rogers | G06Q 40/00 705/40 |
| 8,719,063 | B1 * | 5/2014 | Wade | G06Q 40/08 705/4 |
| 8,843,409 | B2 * | 9/2014 | Rao | G06Q 40/08 705/37 |
| 10,147,141 | B1 * | 12/2018 | Rixford | G06Q 30/0641 |
| 10,417,272 | B1 * | 9/2019 | Carmack | G06F 16/44 |
| 10,678,418 | B1 * | 6/2020 | Nelson | G06F 3/04847 |
| 10,796,370 | B2 * | 10/2020 | Rakshe | G06Q 40/08 |
| 10,909,501 | B2 * | 2/2021 | Marshall | G06Q 10/10 |
| 2004/0226027 | A1 * | 11/2004 | Winter | G06F 8/20 719/328 |
| 2006/0288015 | A1 * | 12/2006 | Schirripa | G06F 16/951 |
| 2007/0185743 | A1 * | 8/2007 | Jinks | G06Q 40/08 705/4 |
| 2009/0094220 | A1 * | 4/2009 | Becker | G06F 16/907 707/999.005 |
| 2010/0324942 | A1 * | 12/2010 | Rogers | G06Q 40/08 709/206 |
| 2011/0022416 | A1 * | 1/2011 | Bergquist | G06Q 10/087 705/4 |
| 2011/0119574 | A1 * | 5/2011 | Rogers | G06F 40/18 715/239 |
| 2011/0320329 | A1 | 12/2011 | Shetty et al. | |
| 2013/0095864 | A1 * | 4/2013 | Marovets | G06Q 30/0239 455/466 |
| 2013/0124229 | A1 * | 5/2013 | Cashman | G06Q 40/08 705/4 |
| 2013/0125211 | A1 * | 5/2013 | Cashman | H04L 63/08 726/4 |
| 2013/0166515 | A1 * | 6/2013 | Kung | G06Q 10/063 707/690 |
| 2014/0039934 | A1 | 2/2014 | Rivera | |
| 2014/0249836 | A1 * | 9/2014 | Moran | G06Q 40/08 705/2 |
| 2015/0066800 | A1 * | 3/2015 | Hawes, III | G06Q 10/06 705/342 |
| 2015/0145872 | A1 * | 5/2015 | Morrison | G06K 15/1823 345/505 |
| 2015/0363478 | A1 * | 12/2015 | Haynes | G06Q 10/06 707/610 |
| 2016/0246759 | A1 * | 8/2016 | Rogers | G06F 40/143 |
| 2018/0341702 | A1 * | 11/2018 | Sawruk | G06N 5/01 |
| 2019/0095173 | A1 * | 3/2019 | Kaufman | G06F 16/284 |

* cited by examiner

SYSTEM AND METHOD FOR SECURE INFORMATION VALIDATION AND EXCHANGE

CROSS-REFERENCE TO RELATED APPLICATION

This Patent Cooperation Treaty patent application claims priority to U.S. Provisional Application No. 62/491,722, filed Apr. 28, 2017, and titled "System and Method for Secure Information Validation and Exchange," the contents of which are incorporated herein by reference in their entirety.

FIELD

Embodiments described herein generally relate to systems and methods for securely collecting and validating structured and unstructured information from an entity to facilitate a binding transaction between that entity and a third party.

BACKGROUND

A party, such as a person or corporation, can purchase insurance from an insurance provider to mitigate risk of certain financial losses. Typically, an insurance provider requires an application from the party seeking insurance (the "applicant") that contains specific confidential information before the insurance provider can determine appropriate coverage limits and an appropriate premium for the applicant.

However, the collection and organization of the required information may be time-consuming or cost-prohibitive to the applicant, reducing the chance that the applicant will complete the application. Incomplete insurance applications increase cost and reduce risk diversification for the insurance provider and potentially expose applicants to unintended confidential information disclosure.

SUMMARY

Embodiments described herein generally reference systems including multiple purpose-configured controllers or systems that securely separate—either functionally, structurally, or physically—data acquisition, validation, and aggregation operations from data distribution operations. As a result of these configurations, an applicant's privacy is protected, application completion times may be reduced, application completion rates may be increased, and an applicant may be able to review a greater number of insurance quotes from a greater number of insurance providers.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

Figure 1:
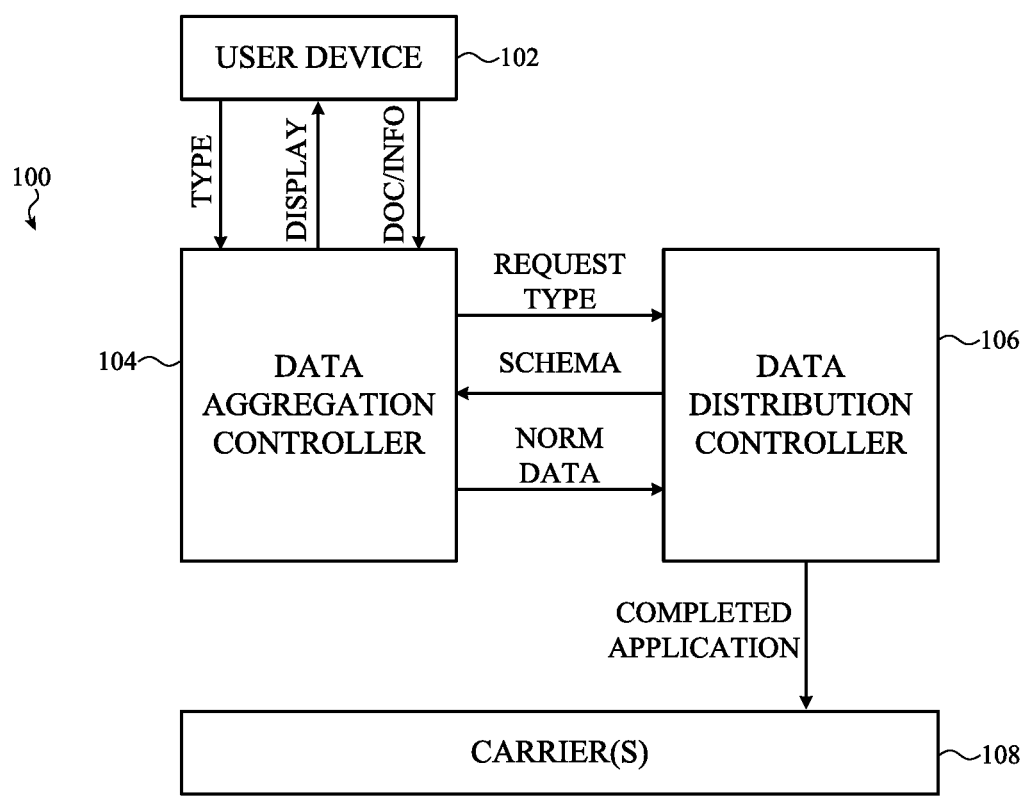
FIG. 1 depicts a simplified diagram of a system such as described herein.

The use of the same or similar reference numerals in different figures indicates similar, related, or identical items. Further, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for facilitating binding transactions between two or more parties. In particular, embodiments described herein reference systems and methods for efficient and secure aggregation, validation, formatting, and exchange of structured, unstructured, and manually-input data necessary to complete a binding transaction between two or more parties. As a result of the constructions and configurations described herein, a binding transaction can be completed in a more efficient, private, and secure manner.

One example of a binding transaction is an insurance transaction between an applicant for insurance and an insurance provider (here, generally, a "carrier"). For simplicity of description, the embodiments and examples that follow reference a real estate insurance transaction. However, it may be appreciated that this is merely one example and the techniques, examples, methods, and systems described herein can be equivalently applied to other transactions (or transaction types) including, but not limited to: renters insurance transactions, automotive insurance transactions, health insurance transactions, liability insurance transactions, travel insurance transactions, corporate or business insurance transactions, personal article insurance transactions, gap insurance transactions, life insurance transactions, appliance insurance transactions, reinsurance transactions, co-insurance transactions, stop-loss insurance transactions, and so on.

To complete a real estate insurance transaction, an applicant completes an application by submitting personal and confidential information to a carrier in order to obtain a quote from that carrier. If the applicant accepts the terms outlined in the quote, the transaction can be completed.

However, in many cases, the information disclosed by the applicant is over-inclusive. For example, an insurance carrier may request a bank statement to verify assets of the applicant. Apart from a balance, the bank statement may also include a transaction record that identifies specific payees, payors, and amounts. In another example, an insurance carrier may request tax forms to verify payment of taxes and to verify total taxable wages of the applicant. Apart from total taxable wages, tax forms may also include deduction amounts or items, charitable giving, ink signatures, and so on. Such information may not be relevant to the insurance carrier, but it is disclosed nonetheless in the course of the conventional insurance application process.

In other conventional cases, an applicant is required to manually enter or otherwise provide a large quantity of information to an insurance carrier in order to obtain a quote. In many cases, the process of entering information is time-intensive. As a result, the applicant may abandon the application process before completion. In this case, the insurance provider loses an opportunity to diversify risk and potentially lower premiums for all policyholders (by acquiring a new policyholder). In addition, in some cases the insurance provider may retain rights to use or sell certain information disclosed by the applicant (e.g., identifying information, contact information, residence information, and so on) in the unfinished application for an unknown period of time. In addition, the process of manually entering information by the applicant is subject to error. As a result, an application may be delayed or a quote may be rescinded at a later time.

In still other conventional cases, an applicant may be required to manually enter similar information multiple times—in different locations of the same application—in order to obtain a quote from an insurance provider. In many cases, the duplicative process of entering the same information numerous times may cause the applicant to abandon the application process before completion or to propagate an error throughout an application. As noted above, in this circumstance, the insurance provider loses an opportunity to diversify risk and the applicant is exposed to potential confidential information disclosure.

In still other conventional cases, an applicant may complete an application in stages, periodically saving a pending application. In this circumstance, the applicant may be exposed to unintended confidential information disclosure of the information contained in one or more application drafts.

In still other conventional cases, an applicant may desire to compare quotes from a number of carriers before selecting a particular policy from a particular carrier. In many cases, the applicant must manually enter or otherwise provide a large quantity of information to each individual carrier in order to obtain a quote from that carrier. As noted above, the process of entering information multiple times in multiple locations for multiple carriers is time-intensive and subject to error. As a result, the applicant may abandon the application process before completion or may only seek quotes from a small number of insurance providers; a more favorable insurance policy or premium from a different carrier may not be knowable to the applicant.

In still other conventional cases, an applicant may provide information to an insurance broker that, in turn, submits the party's information to various insurance carriers with whom the insurance broker has a referral relationship. As such, the applicant only receives quotes from insurance providers with whom the broker has an existing, established, relationship. For example, in some cases, an insurance broker may have an online presence or portal. Carriers can license access to the portal. An applicant submitting an application through the portal does not receive quotes from carriers that have not licensed access to the portal. As with other conventional cases described above, in this circumstance, a potentially more favorable insurance policy from another carrier is not known or knowable to the applicant.

In still other conventional cases, an insurance broker distributes (and monetizes) financial information from the applicant only providing notice of the disclosure to third parties in a privacy policy that is not typically read or understood by the applicant. In this circumstance, the applicant is exposed to unintended confidential information disclosure.

Accordingly, embodiments described herein reference systems and methods for secure and efficient aggregation, validation, formatting, and exchange of structured, unstructured, and manually-input data necessary to complete an insurance application and to securely distribute that application, without unnecessary information or over-disclosure, to any number of insurance carriers.

More specifically, systems described herein include multiple purpose-configured controllers or systems that securely separate—either functionally, structurally, or physically—data acquisition, validation, and aggregation operations from data distribution operations. As a result of these configurations, an applicant's privacy is protected, application completion times may be reduced, application completion rates may be increased, and an applicant may be able to review a greater number of insurance quotes from a greater number of insurance providers.

These and other embodiments are discussed below with reference to FIGS. 1-14. However, those skilled in the art will readily appreciate that the detailed description given herein with respect to these figures is for explanation only and should not be construed as limiting.

For example, FIG. 1 depicts a simplified system diagram of an embodiment described herein. The illustrated system (identified as the system 100) is accessed—via a direct or network connection—by a user device 102.

The user device 102 can be any suitable device such as, but not limited to: a cellular phone, a laptop computer, a tablet computer, a desktop computer, and so on. Typically the user device 102 is operated by the applicant, but this may not be required. For example, in other embodiments, the user device 102 may be a device operated by an agent or representative of the applicant. In further examples, more than one user device (or agent device) can be associated with the system 100.

The system 100 also includes an automated data aggregation controller 104 and a data distribution controller 106 that securely communicate with one another (and/or other systems or controllers not shown) to collect and exchange only that information which is necessary to complete an application that can be distributed to one or more insurance carriers, identified as the carriers 108.

In one embodiment, the process of collecting, validating, and distributing information associated with an application can begin after the user device 102 sends a signal or communication to the automated data aggregation controller 104 describing the type of transaction (e.g., real estate insurance, personal property insurance, vehicle insurance, and so on) the applicant operating the user device 102 desires to complete.

In some embodiments, once a particular application type is determined, the automated data aggregation controller 104 can forward the request type to the data distribution controller 106. The data distribution controller 106 can access a carrier database (not shown) including the carriers 108 that may be able to offer a quote to the applicant based on the request type received from the automated data aggregation controller 104. For example, the carrier database may include different insurance carriers associated with different markets or carriers associated with different types of insurance. One of skill in the art may appreciate that such a database may be a first-party database or a third-party database; the carrier database can be implemented in any number of suitable ways.

Once a set of potential carriers is determined, the system 100 may operate to collect and validate information to complete one or more applications associated with those carriers. In other embodiments, the set of potential carriers can be updated and/or changed at a later time. In still further embodiments, the set of potential carriers may not be determined at this time.

The automated data aggregation controller 104 is configured to receive and/or collect information in the form of digital data in any number of suitable ways. For example, in many embodiments, the automated data aggregation controller 104 is configured to collect, validate, and organize information related to (or directly provided by) the applicant from a variety of local or remote information sources (e.g., first-party databases, third-party databases, direct data input, and so on). The information from the applicant can include any suitable information such as, but not limited to: identity information, tax information, real or personal property information, income information, savings information, debt information, family information, real estate information, employment information, and so on.

Specific digital data that represents specific information from (or associated with) the applicant can be received or produced by the automated data aggregation controller 104 from a variety of sources and/or in a variety of forms or formats including, but not limited to: manually input data (e.g., provided by the applicant and/or the applicant's agent, such as name data), retrieved data (e.g., structured data from a first-party or third-party database in response to a query, such as address data), extracted data (e.g., values extracted from documents, such as tax data extracted from tax documents), inferred data (e.g., values determined based on existence or absence of data, such as employment status based on tax information), and/or calculated data (e.g., calculated data based on other data, such as an age from birthdate information).

Once collected as digital data, the automated data aggregation controller 104 can validate the data by performing a suitable data validation operation. In some examples, a data validation operation may include, but may not be limited to: spelling validation, grammar validation, format validation, numerical range validation, forbidden character checking, data sanitizing operations, and so on. In many cases, data validation techniques and operations performed by the automated data aggregation controller 104 may vary from application to application and/or from applicant to applicant. Generally and broadly, data that has been validated and/or sanitized by an automated data aggregation controller 104 is referred to herein as "normalized data."

The data distribution controller 106 is configured to package and securely distribute data and information—collected by the automated data aggregation controller 104—to the carriers 108, one or more rating organizations, or other entities. The data distribution controller 106 may be configured to submit the information in an industry-standard format (e.g., Residential Loan Data Format 1003) and/or a carrier-specific format. In some cases, the data distribution controller 106 can anonymize the identity of the applicant—where appropriate—when submitting the application, but this may not be required.

The data distribution controller 106 is also configured to communicate requirements of a particular application—or combined requirements of a set of applications—to the automated data aggregation controller 104. In particular, in many embodiments, the data distribution controller 106 is configured to instruct the automated data aggregation controller 104 regarding the type and/or format of data required for a particular application (or applications) for a particular carrier (or set of carriers).

Herein, information transmitted from the data distribution controller 106 to the automated data aggregation controller 104 is generally referred to as an aggregation/validation schema (or more simply, a "schema") A schema can include any number of suitable fields, formats, value representations, or encodings and it is appreciated that the specific content, format, or mechanism by which a schema is distributed can vary from embodiment to embodiment. A schema such as described herein does not typically include any personally-identifying information, but this may not be required.

In typical embodiments, the schema is transmitted from the data distribution controller 106 to the automated data aggregation controller 104 as structured data across a secure network connection (e.g., javascript object notation or extensible markup language formatted file distributed via a secure sockets layer), but this may not be required of all embodiments. In many cases, a schema includes information regarding requirements of a particular application (e.g., format, type, maximum length, and so on) in addition to validation definitions or functions (herein, generally, "validation definitions") used by the automated data aggregation controller 104 to validate or reformat specific data in a particular manner.

For example, if the data distribution controller 106 determines that only name information is required for a particular application associated with a particular carrier of the carriers 108, the data distribution controller 106 can communicate a schema to the automated data aggregation controller 104 that includes an indication that only name information is required. The schema can also include validation definitions associated with the name information required by the application.

In this example, validation definitions can include, but may not be limited to, definitions associated with: capitalization, encoding, format, spacing, character count, and so on. In response to receiving the schema, the automated data aggregation controller 104 obtains (e.g., via manual input, or another method) and validates (e.g., in accordance with the validation definition) a digital representation of the name of the applicant (e.g., as a string, data object, encrypted string, un-typed object, or any other suitable digital representation).

Thereafter, the automated data aggregation controller 104 communicates the normalized name data to the data distribution controller 106. In response, the data distribution controller 106 inserts the normalized name data into an appropriate field of the application and forwards the application to the associated carrier via a secure channel.

As a result of the topology described herein, the data distribution controller 106 does not receive any unnecessary information or any improperly-formatted information from the applicant. Similarly, the carrier does not receive any unnecessary information, any partially-complete application drafts, or any improperly-formatted information from the applicant. In this manner, the applicant's data privacy is protected from third parties.

In further examples, the automated data aggregation controller 104 may be configured to determine an efficient means of collecting information required for a particular application. For example, the automated data aggregation controller 104 may be associated with or may be in communication with a document content database (not shown) that stores information about data typically contained in various documents, such as driver's licenses, bank statements, tax forms, real estate documents, passport documents, social media sites, email databases, and so on. The automated data aggregation controller 104 may query the document content database with information from the schema received from the data distribution controller 106 and the database may return an optimized or minimized set of document types that contain all or substantially all information required for the application(s). In this manner, unnecessary data entry by the applicant is mitigated.

For example, in one embodiment, a data distribution controller 106 can determine that only a first name, a last name, and an address are required for a particular application. In response to the determination, the data distribution controller 106 distributes an appropriate schema to an automated data aggregation controller 104. The automated data aggregation controller 104 queries a document content database that determines that the first name, last name, and address information are all content of the applicant's driver's license.

In one embodiment, the automated data aggregation controller 104 may send a signal to the user device 102 that causes the user device 102 to render a user interface on a display that requests the applicant retrieve the driver's license and to enter information from that license into fields rendered within the user interface.

In other embodiments, the automated data aggregation controller 104 can request a photograph of the applicant's driver's license. From the photograph, the automated data aggregation controller 104 can extract only the first name, last name, and address information. More specifically, the automated data aggregation controller 104 in this example may ignore and/or discard other information within the photograph of the driver's license such as, but not limited to: organ donor status, identification issue or expiration dates, identification number, the applicant's signature, the applicant's photo, the applicant's middle name or initial, and so on.

Thereafter, the automated data aggregation controller 104 validates the first name, last name, and address data retrieved from the driver's license and communicates the normalized first name data, normalized last name data, and normalized address data to the data distribution controller 106. In response, the data distribution controller 106 inserts the normalized data into appropriate fields of the application(s) and forwards the completed application(s) to the associated carrier(s). In this manner, the data distribution controller 106 does not receive any unnecessary information or any improperly formatted information from the applicant. Similarly, the carrier does not receive any unnecessary information, any partially-complete application drafts, or any improperly-formatted information from the applicant. In this manner, the applicant's data privacy is protected from third parties.

One may appreciate that as a result of limiting the information collected by the automated data aggregation controller 104 (and later transmitted to the data distribution controller 106), unnecessary disclosure of information by the applicant is reduced and privacy is protected.

Specific implementations of the automated data aggregation controller 104 and the data distribution controller 106 can vary from embodiment to embodiment. In many cases, the automated data aggregation controller 104 and the data distribution controller 106 are implemented as (or on, as a set of computer instructions stored in a non-volatile memory) virtual and/or physical servers or server clusters that communicate with one another across one or more secure communication channels. In other cases, one or more portions of the automated data aggregation controller 104 or the data distribution controller 106 may be implemented in software distributable to an electronic device of the applicant, such as the user device 102.

The foregoing embodiments depicted in FIG. 1 and the various alternatives thereof and variations thereto are presented, generally, for purposes of explanation, and to facilitate an understanding of various configurations of a system, such as described herein. However, it will be apparent to one skilled in the art that some of the specific details presented herein may not be required in order to practice a particular described embodiment, or an equivalent thereof.

For example, it may be understood that—generally and broadly—embodiments described herein separate and/or isolate data collection and validation functions of an insurance application processing system from data distribution functions of the same system. In particular, an automated data aggregation controller operates separately from a data distribution controller. As a result of the separation of functionality, an applicant's privacy is protected by preventing over-disclosure and distribution of incomplete applications. In further embodiments, the divided functionality described herein also decreases the time required to complete multiple insurance applications. In particular, the data distribution controller provides a schema—containing both content and validation information—to the automated data aggregation controller. The automated data aggregation controller uses the schema to determine what information is required, how data that represents that information should be formatted, and what documents, questions, or databases should be accessed or requested in order to obtain that data. In this manner, all information necessary for a particular application can be aggregated and formatted without substantial input from the applicant.

One of skill in the art will appreciate that any number of suitable databases and/or automated data aggregation controllers or modules may be associated with the automated data aggregation controller. For example, an automated data aggregation controller such as described herein may crawl a variety of public and/or proprietary databases in order to collect information about an application—without substantial input from the applicant. For example, in one embodiment, the applicant accesses the automated data aggregation controller via a web page. In this example, the web page and/or the automated data aggregation controller may interface with a social media persistent presence plugin that contains basic identity information, such as a name and an email address. From the name and email address—with the applicant's permission—the automated data aggregation controller can access a voter database and/or another public database to determine an address, a birthdate, and family status. With the address information—and with the applicant's permission—the automated data aggregation controller can access a real estate database to determine ownership information, such as a legal description of the property and the sales history of the property. With the birthdate information and the previously-acquired name information—and with the applicant's permission—the automated data aggregation controller can query a number of public databases to obtain employment information, vehicle ownership information, and so on. A person of skill in the art will appreciate that the automated data aggregation controller can continue aggregating information in this manner until no additional useful or required information may be obtained. Thereafter, the automated data aggregation controller may request additional information from the applicant (e.g., answers to specific questions, non-public information, and so on), after which the aggregation process may begin again.

Once the required information is gathered and validated according to the validation definitions in the schema, the automated data aggregation controller distributes the reformatted data to the data distribution controller. The data distribution controller thereafter packages and distributes the data to one or more carriers.

After the carriers receive the application(s) distributed by the data distribution controller, the carriers may communicate quotes back to the data distribution controller which, in turn, can convey the quotes directly—or via the automated data aggregation controller—to the applicant. The applicant can review the various quotes returned and may select a quote. Once selected, the transaction may be completed.

Accordingly, it may be appreciated that the general system described herein—in which collection, automated aggregation, and validation operations are functionally separate from distribution functions—may be implemented in any number of suitable ways. In some embodiments, an automated data aggregation controller and a data distribution controller are implemented as separate services operating on separate servers. In other cases, an automated data aggregation controller and a data distribution controller may be separate software modules operating within the same application package. In some cases, one or more portions of the automated data aggregation controller and/or the data distribution controller are operated on a device owned and/or operated by the applicant or by an agent of the applicant.

Figure 2A:
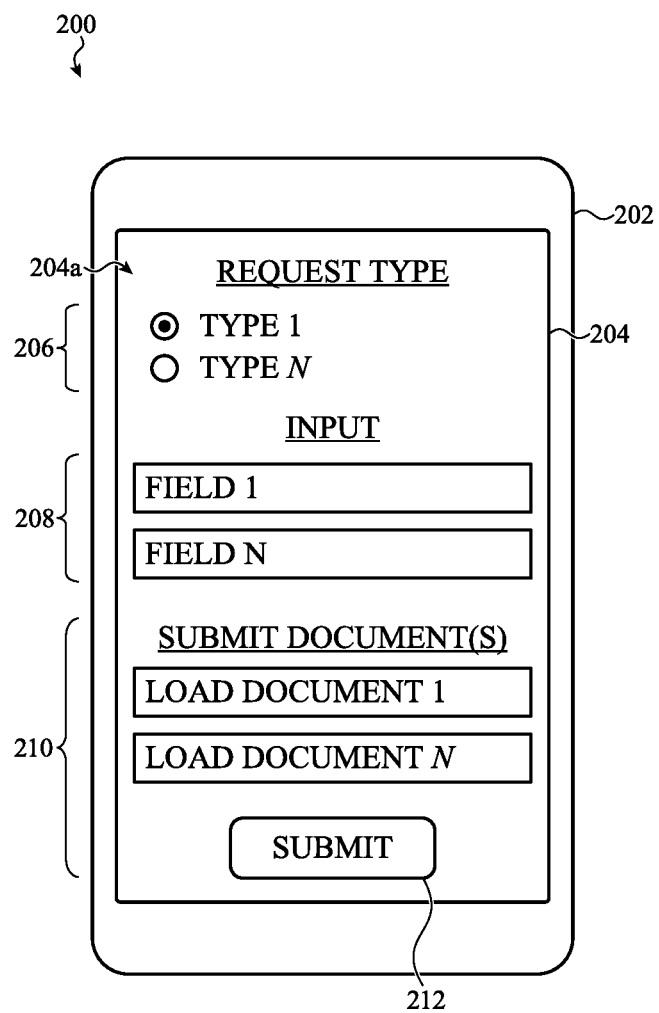
FIG. 2A depicts an electronic device configured to collect, validate, and display structured and unstructured data.
Figure 2B:
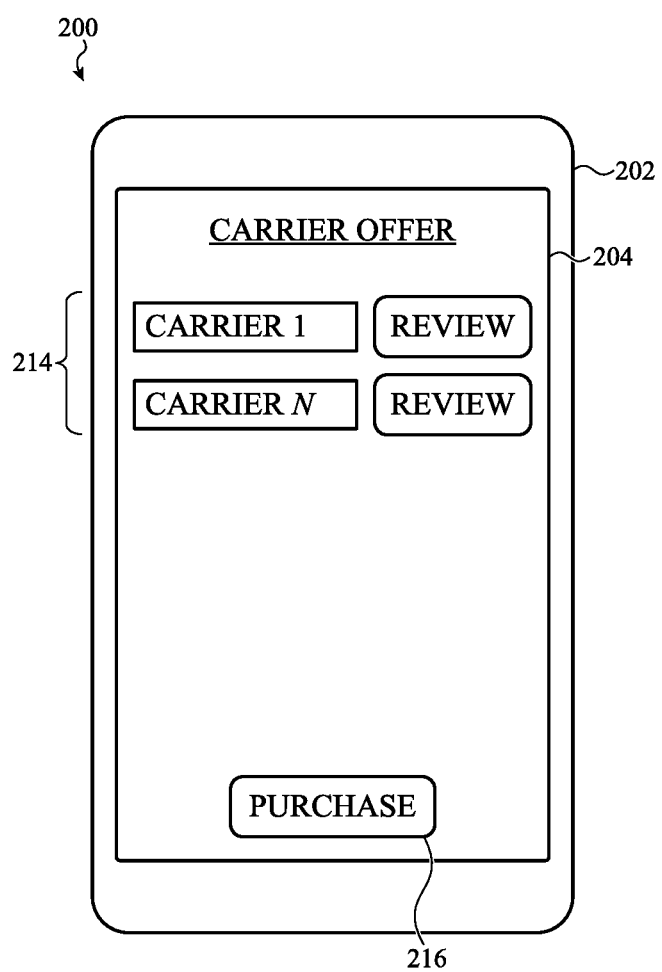
FIG. 2B depicts the electronic device of FIG. 2A, specifically showing an example configuration in which the electronic device provides an option to facilitate a binding transaction.

For example, FIGS. 2A-2B depict an embodiment including an electronic device configured to access or otherwise operate with an automated data aggregation controller and/or a data distribution controller such as described herein. It will be appreciated, however, that the depicted examples are not exhaustive; the various embodiments described with reference to FIGS. 2A-2B may be modified or combined in any number of suitable or implementation-specific ways.

Specifically, FIG. 2A depicts an electronic device 200. The electronic device 200 can be any suitable electronic device, such as but not limited to: cellular phones, tablet computers, laptop computers, desktop computers, internet-connectable devices, intranet-connectable devices, and so on. In one example, the electronic device 200 is a portable electronic device that wirelessly connects to a remote server or server group, although this may not be required. The electronic device 200 can include one or more of: a processor, a transitory memory, a non-transitory memory, a display, a user input system, a wireless or wired communication module, and so on. In many cases, the electronic device 200 is configured to store program instructions executable by a processor in a non-transitory memory. In some embodiments, one or more portions of a system, such as described herein, can be implemented in whole or in part as executable instructions stored in a non-transitory memory within or accessible to the electronic device 200.

In the illustrated embodiment, the electronic device 200 includes a housing 202 that encloses and accommodates a display 204 that can be operably or communicably coupled to a processor (not shown) such as described above. In many cases, the display 204 is operably coupled to a user input system, such as a touch input system, in order to receive input from a user of the electronic device 200.

The display 204 can be configured to render a graphical user interface 204a associated with a system, such as an automated data aggregation controller such as described herein. As with other embodiments described herein, the data aggregation system may be configured to operate entirely or partially on the electronic device 200. In other cases, the electronic device 200 communicates with the data aggregation system via a secure communications network. In other cases, portions of the data aggregation system operate on the electronic device 200 whereas other portions operate remotely.

As with other embodiments described herein, the data aggregation system is in communication with a data distribution system. More particularly, the data aggregation system is configured to receive a schema from the data distribution system that informs the function and operation of the automated data aggregation controller. In addition, the schema can include information that informs the graphical user interface 204a which fields, images, or instructions to display for an applicant operating the electronic device 200.

In one embodiment, the graphical user interface 204a can be configured to request input (e.g., manually-input data, photographic data, video data, audio data, biometric data, login data or information, document information) from the applicant. For example, the graphical user interface 204a can present selectable options, such as the selectable options 206. In some cases, more than one selectable option of the selectable options 206 can be selected at a time. In other cases, each selectable option of the selectable options 206 is mutually exclusive; only one option may be selected at any time. The graphical user interface 204a can also present text entry fields, such as the input fields 208. The input fields 208 may be configured to receive alphanumeric input, hand-drawn input, numeric-only input, symbol-only input, and so on.

The graphical user interface 204a can also present means for the user to upload files, such as the upload fields 210. The upload fields 210 may be configured to receive files by drag-and-drop, via a user-operated file selection dialog, or by any other suitable method. In some cases, the upload fields 210 can be configured to receive a web address of a remote file. The upload fields 210 may be configured to receive files in a specific or arbitrary format. The graphical user interface 204a may also provide one or more input buttons, such as the submit button 212.

It may be appreciated that the graphical user interface 204a can be configured to receive input from a user in any number of suitable ways; the specific examples identified in the figure are understood to be non-limiting. For example, in other embodiments, the graphical user interface 204a can include, without limitation: physical or virtual inputs, photographic or video input, microphone input, biometric input, haptic or mechanical input, and so on.

In many embodiments, the graphical user interface 204a is used to collect information from an applicant for insurance. More specifically, the applicant operating the electronic device 200 executes a software application (or visits an address of a web application) which, in turn, presents the graphical user interface 204a. As noted above, the application provides the applicant access to an automated data aggregation controller (not shown). The application initially presents the applicant with a series of selectable options, such as the selectable options 206, each of which is associated with a particular insurance application type that is supported by the automated data aggregation controller. For example, in one embodiment, a first selectable option of the selectable options 206 may be associated with automotive insurance, a second selectable option of the selectable options 206 may be associated with homeowner's insurance, and a third selectable option of the selectable options 206 may be associated with renter's insurance. In other cases, other selectable options may be presented to the applicant.

In many examples, while the selectable options 206 are displayed, other input elements such as, but not limited to: the input fields 208, the upload fields 210, and the submit button 212 may be hidden.

Once the applicant makes a selection, the automated data aggregation controller can communicate that selection to the data distribution controller (not shown). Based on the selection—and/or other information (e.g., location of applicant, time or date, applicant age, and so on)—the data distribution controller can communicate a schema to the automated data aggregation controller.

Thereafter, the automated data aggregation controller can parse the schema and, based on the schema, cause the graphical user interface 204a to change in order to request information from the applicant. For example, if the schema from the data distribution controller indicates that the application only requires identity information from the applicant, the graphical user interface 204a may be modified to show only fields or inputs related to collecting or displaying identity information, such as the input fields 208.

Once information is collected from the applicant via the graphical user interface 204a and/or collected automatically by the automated data aggregation controller, the automated data aggregation controller can validate the information aggregated according to one or more validation definitions within the associated schema. Thereafter, as noted with respect to other embodiments described herein, the automated data aggregation controller can communicate appropriately-formatted data to the data distribution controller (not shown). Thereafter, the data distribution controller assembles an application in a suitable industry-standard or carrier-specific format and distributes the application to a set of carriers which, in turn, may opt to return a quote to the applicant that may be shown on the graphical user interface 204a (see, e.g., FIG. 2B) as a set of quotes 214. Thereafter the applicant can select a quote from the set of quotes 214 and purchase 216 an insurance policy from the respective carrier.

The foregoing embodiments depicted in FIGS. 2A-2B and the various alternatives thereof and variations thereto are presented, generally, for purposes of explanation, and to facilitate an understanding of various configurations of a system, such as described herein. However, it will be apparent to one skilled in the art that some of the specific details presented herein may not be required in order to practice a particular described embodiment, or an equivalent thereof.

For example, it may be appreciated that the user device and the graphical user interface depicted can take any number of suitable forms and may vary from embodiment to embodiment. For example, in some cases, as noted above, a user device may be a laptop computer. In other cases, an agent of the applicant may access the automated data aggregation controller on behalf of the user. In these cases, the agent may receive a different user interface than an applicant. Similarly, a schema delivered to the automated data aggregation controller by the data distribution controller may be different for an agent than for an applicant. For example, a schema associated with an agent may cause the graphical user interface to render a field configured to accept upload of an industry-standard data file whereas a schema associated with an applicant may cause the graphical user interface to render a field configured to accept a user-supplied document. As such, more generally, it may be appreciated that a system such as described herein may be configured differently when accessed by an industry professional (e.g., agent) than when the system is accessed by an applicant directly.

Other embodiments may be implemented in a different manner. For example, in some cases, an automated data aggregation controller and a data distribution controller can be coordinated by a separate system generally referred to as a system coordinator.

Figure 3:
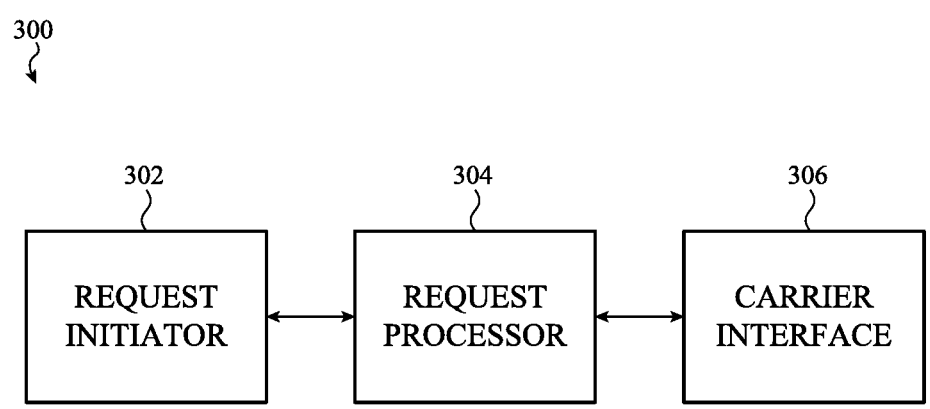
FIG. 3 is a simplified flow chart of a system for transacting structured and unstructured data, such as described herein.

FIG. 3 depicts a simplified system diagram of a system coordinator such as described herein. The system coordinator can be configured to control, execute, and/or coordinate one or more functions of an automated data aggregation controller or a data distribution controller such as described herein. The system coordinator can be implemented as a server, a group of servers, or any other suitable system configurable to perform the functions and operations (and alternatives thereto) such as described herein. It may be appreciated that for simplicity of illustration and description, portions of an automated data aggregation controller and a data distribution controller implemented by and/or supervised by the system coordinator are omitted from FIG. 3.

More specifically, a system coordinator 300 such as described herein includes a request initiator 302, a request processor 304, and a carrier interface 306. Each of the modules, components, or subsystems may be configured in any suitable implementation-specific manner. In some cases, the subsystems of the system coordinator 300 may be implemented as physically separate components, although this may not be required of all embodiments.

The request initiator 302 of a system coordinator 300 such as described herein can be configured to receive a request from a user device, an agent device, or from an automated data aggregation controller such as described herein. The request is typically a request to initiate a new insurance application, although this may vary from embodiment to embodiment. The request can be any suitable request including, but not limited to: a text or data message, a telephone call, an email, application programming interface access, and so on.

For example, in one embodiment, the request initiator 302 includes a network interface for sending and receiving instructions or requests securely from one or more devices, such as a user device or an agent device. The instructions or requests may include account credentials or other private or confidential information.

The request initiator 302 can determine an appropriate response to the request or instruction. For example, if a user device or an agent device sends a request to the request initiator 302 that can be processed by the system, the request initiator 302 may send an instruction to the request processor 304.

The request processor 304 of a system coordinator 300 such as described herein can be configured to coordinate the exchange of information between an automated data aggregation controller and a data distribution controller such as described herein (see e.g., FIG. 1). In some cases, the request processor 304 may be configured as an intermediary between the automated data aggregation controller and the data distribution controller, whereas in other cases, the request processor 304 may merely facilitate secure information transactions between the automated data aggregation controller and the data distribution controller. Once an application is complete (e.g., the automated data aggregation controller has collected, validated, and formatted all required information), the request processor 304 can forward the application to a carrier interface 306 (e.g., loan origination software managed by a carrier or broker).

The carrier interface 306 of a system coordinator 300 such as described herein can be configured to select and distribute applications to particular carriers. In some cases, the carrier interface 306 may be configured to interface with custom application programming interfaces of certain carriers, but this may not be required. For example, in some embodiments, the carrier interface 306 may provide the application to a selected set of carriers in an industry-standard format.

The foregoing embodiments depicted in FIG. 3 and the various alternatives thereof and variations thereto are presented, generally, for purposes of explanation, and to facilitate an understanding of various configurations of a system coordinator. However, it will be apparent to one skilled in the art that some of the specific details presented herein may not be required in order to practice a particular described embodiment, or an equivalent thereof.

Generally and broadly, FIGS. 4-8 depict various portions, subsystems, and/or specific implementations of a system such as described herein.

Figure 4:
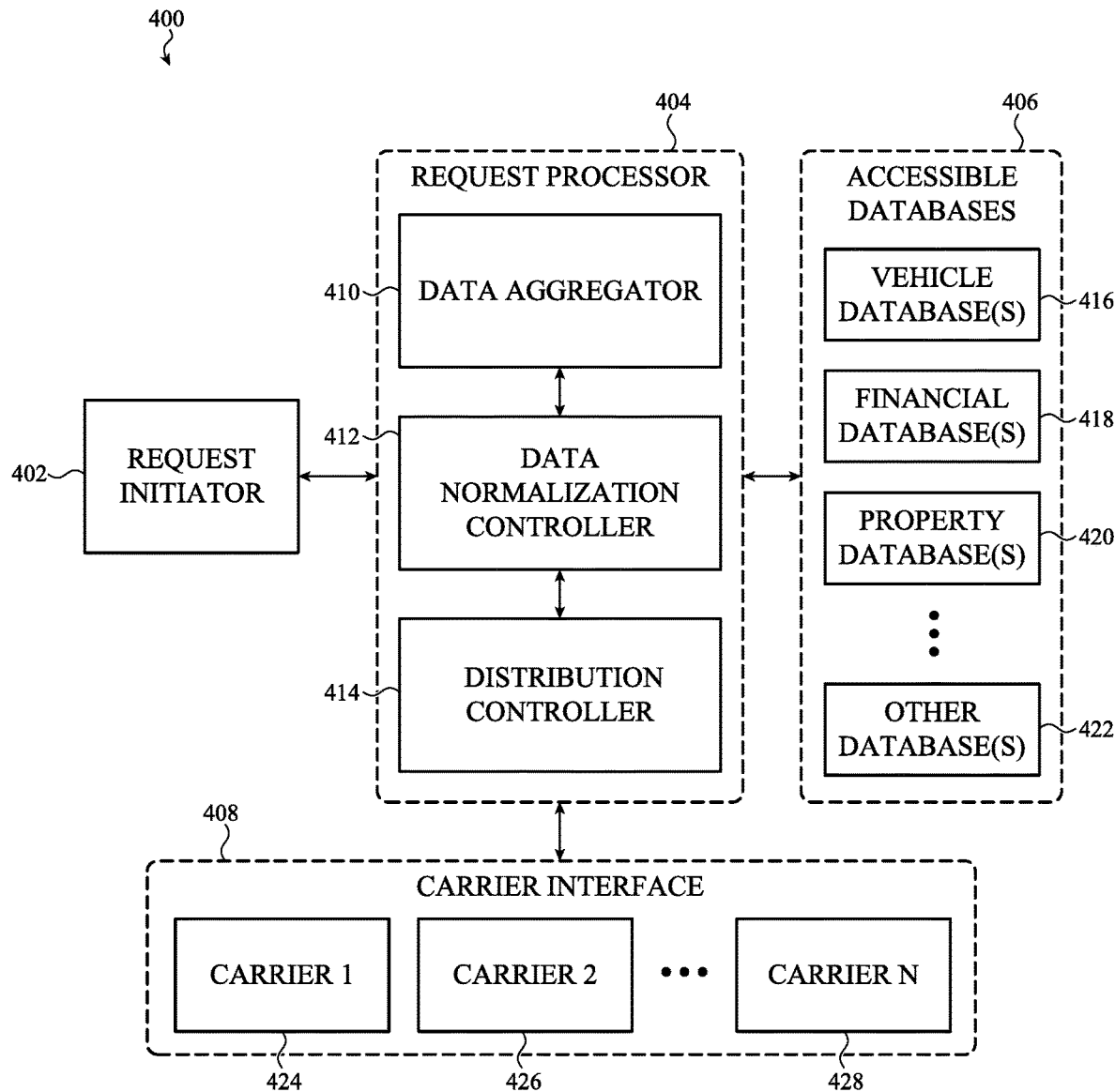
FIG. 4 is a simplified flow chart of another system for transacting structured and unstructured data, such as described herein.

FIG. 4 is a simplified flow chart of another system, such as described herein. The system 400 implements the functionality of an automated data aggregation controller and a data distribution controller such as described herein.

The system 400 includes a request initiator 402 that receives an applicant or agent request to being a data aggregation operation. The request initiator 402 is in communication with a request processor 404. The request processor 404 in turn is communicably coupled to one or more external databases (identified as the accessible databases 406) and to one or more carrier interfaces (identified as the carrier interfaces 408).

The request processor 404 of the system 400 includes a data aggregator 410. The data aggregator 410 is communicably coupled to a data normalization controller 412, and a distribution controller 414.

The data aggregator 410 is associated with an automated data aggregation controller such as described herein. Accordingly, the data aggregator 410 can be configured to collect information from an applicant or agent in any suitable manner including but not limited to: document upload and reading, remote document linking, manual data entry, photographic or scan document upload, digital signature, and so on. The data aggregator 410 is also communicably coupled to the accessible databases 406, which can include a vehicle database 416, a financial database 418, a property database 420, or any other suitable database 422. One of skill in the art will appreciate that any number of suitable databases, whether local or remote or first or third party, can be included and/or accessible to the data aggregator 410.

As with other embodiments described herein, the data aggregator 410 can be configured to receive and/or collect information form an applicant or an agent of an applicant in the form of digital data in any number of suitable ways. For example, in many embodiments, the data aggregator 410 is configured to collect, validate, and organize information related to (or directly provided by) the applicant from a variety of local or remote information sources (e.g., the accessible databases 406). The information from the applicant can include any suitable information such as, but not limited to: identity information, tax information, real or personal property information, income information, savings information, debt information, family information, real estate information, employment information, and so on.

Specific digital data that represents specific information from (or associated with) the applicant can be received or produced by the data aggregator 410 from a variety of sources and/or in a variety of forms or formats including, but not limited to: manually input data, retrieved data, extracted data, inferred data, and/or calculated data.

Once collected as digital data, the data aggregator 410 can pass the raw collected data to the data normalization controller 412. The data normalization controller 412 is configured to validate the data by performing a suitable data validation operation to generate normalized data. In some examples, a data validation operation may include, but may not be limited to: spelling validation, grammar validation, format validation, numerical range validation, forbidden character checking, data sanitizing operations, and so on. In many cases, data validation techniques and operations performed by the data normalization controller 412 may vary from application to application and/or from applicant to applicant.

The normalized data is thereafter passed to the distribution controller 414 that, in turn is configured to insert the normalized data into a carrier-specific or carrier-agnostic format that is distributable to one or more carriers via the carrier interface 408. Such carriers can include the carriers 424, 426, 428. In this manner, as with other embodiments described herein, information provided by an applicant or agent or request initiator is filtered, validated, and formatted before distribution. In this manner, an applicant's privacy is protected from both insurance carriers and third-party database managers.

Figure 5:
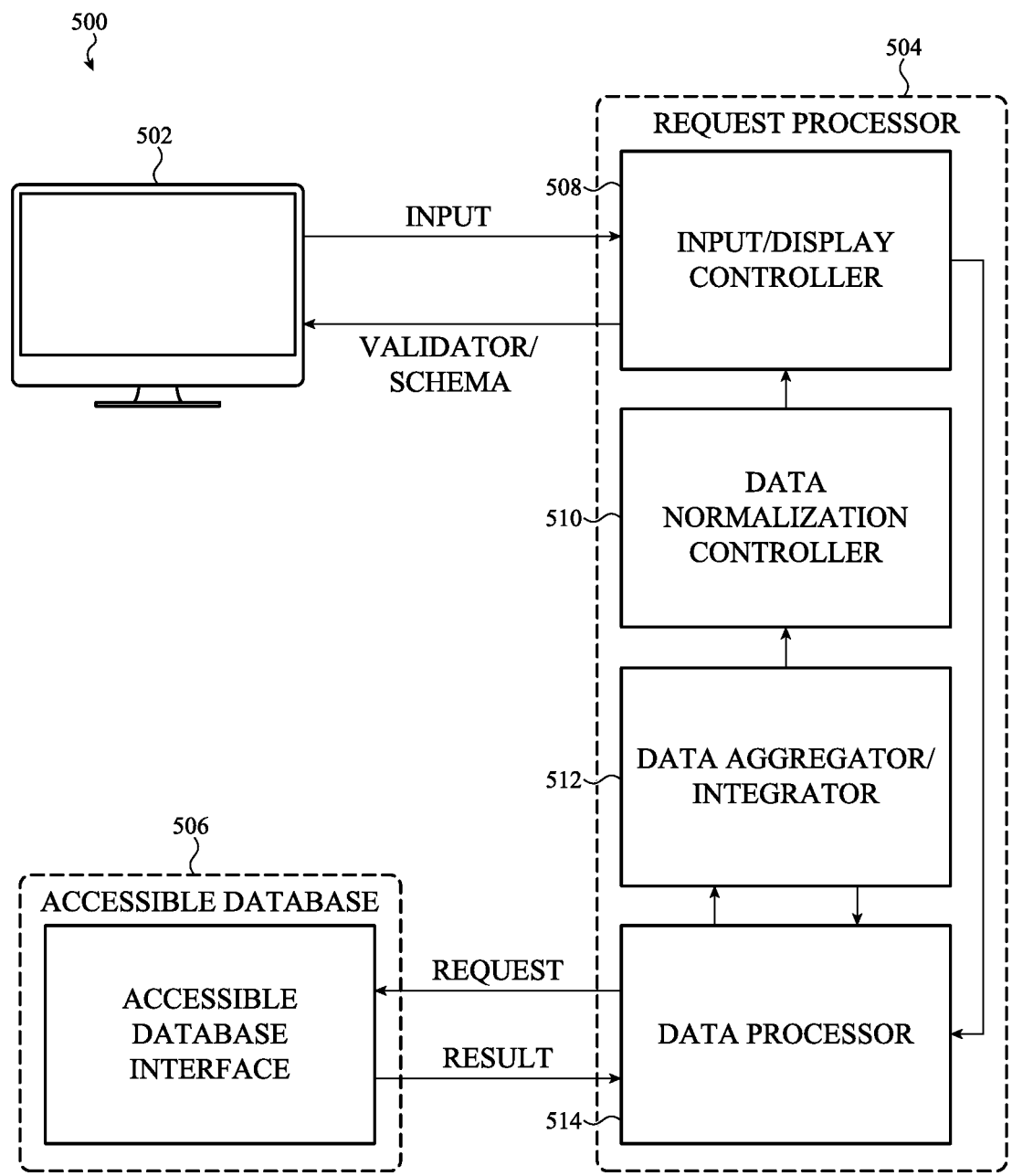
FIG. 5 is a simplified flow chart of a system for automatically collecting and validating structured and unstructured data, such as described herein.

In other embodiments, a system such as described herein can be configured in another manner. For example, FIG. 5 depicts a simplified flow chart of a system for automatically collecting and validating structured and unstructured data, such as described herein. As with other embodiments described herein, the system 500 implements one or more components or functions of an automated data aggregation controller and/or a data distribution controller such as described herein.

The system 500 includes a request initiator 502 that receives an applicant or agent request to begin a data aggregation operation. In the illustrated embodiment, the request initiator 502 may be configured to operate on a desktop computing device, but this may not be required of all embodiments.

As with other embodiments described herein, the request initiator 502 is in communication with a request processor 504 that in turn is in communication with one or more external databases 506. The request processor 504 in this embodiment includes an input controller 508, a data normalization controller 510, a data aggregator 512 and a data processor 514. The data processor 514 may, in turn, be coupled to the one or more accessible databases 506. One of skill in the art will appreciate that any number of suitable databases, whether local or remote or first or third party, can be included and/or accessible to the data aggregator 512.

As with other embodiments described herein, the request processor 504 of the system 500 implements certain functionality of an automated data aggregation controller such as described herein. More particularly, the input controller 508 of the request processor 504 can be configured to communicate with the request initiator 502 to receive input from an applicant or agent. In other cases, the input controller 508 may be configured to generate or process one or more schemas and/or validation definitions that can be distributed to the request initiator or the data normalization controller 510.

As with other embodiments described herein, the data aggregator 512 is a physical or software component associated with an automated data aggregation controller such as described herein. Accordingly, the data aggregator 512 can be configured to collect information from an applicant or agent in any suitable manner including but not limited to: document upload and reading, remote document linking, manual data entry, photographic or scan document upload, digital signature, document or information narration, and so on.

The data aggregator 512 is also communicably coupled to the accessible databases 506 via the data processor 514. In this manner, the data processor 514 serves as an intermediary between third-party databases and portions of the automated data aggregation controller.

As with other embodiments described herein, the data aggregator 512 can be configured to receive and/or collect information from an applicant or an agent of an applicant in the form of digital data in any number of suitable ways. For example, in many embodiments, the data aggregator 512 is configured to collect, validate, and organize information related to (or directly provided by) the applicant from a variety of local or remote information sources (e.g., the accessible databases 506). The information from the applicant can include any suitable information such as, but not limited to: identity information, tax information, real or personal property information, income information, savings information, debt information, family information, real estate information, employment information, and so on.

As noted above, specific digital data that represents specific information from (or associated with) the applicant can be received or produced by the data aggregator 512 from a variety of sources and/or in a variety of forms or formats including, but not limited to: manually input data, retrieved data, extracted data, inferred data, and/or calculated data.

Once collected as digital data, the data aggregator 512 can pass the raw collected data to the data normalization controller 510. The data normalization controller 510 is configured to validate the data by performing a suitable data validation operation to generate normalized data. In some examples, a data validation operation may include, but may not be limited to: spelling validation, grammar validation, format validation, numerical range validation, forbidden character checking, data sanitizing operations, and so on. In many cases, data validation techniques and operations performed by the data normalization controller 510 may vary from application to application and/or from applicant to applicant.

The normalized data is thereafter passed back to the input controller 508 that, in turn, can present the data to the request initiator 502 for applicant or agent validation or verification.

Figure 6:
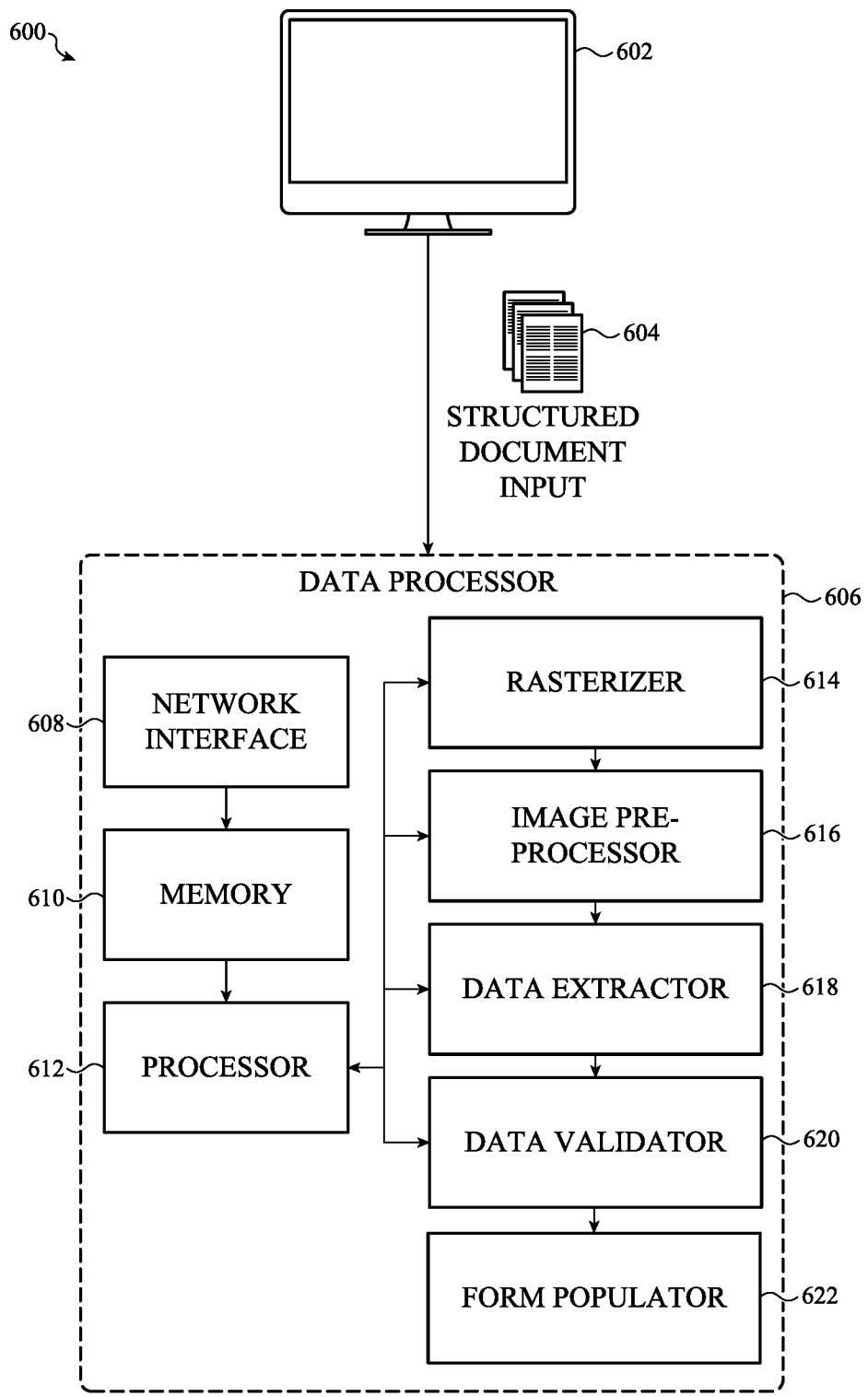
FIG. 6 is a simplified flow chart of a system for automatically structuring data from an unknown source.

In other embodiments, a system such as described herein can be configured in another manner. For example, FIG. 6 is a simplified flow chart of a system for automatically structuring data from an unknown source.

As with other embodiments described herein, the system 600 implements one or more components or functions of an automated data aggregation controller and/or a data distribution controller such as described herein. In particular, the system 600 is a portion of an automated data aggregation controller such as described herein that is configured to extract information structured documents or unstructured documents from an unknown source or quality. In some examples, a structured or unstructured document may be a tax document and the unknown source may be: a scan of a tax document, a photograph of a tax document, a portable document format tax document with a text layer, a portable document format tax document without a text layer, and so on. In another example, a structured document may be an industry-standard format such as the Residential Loan Data Format 1003.

As with other embodiments, the system 600 includes a request initiator 602 that receives an applicant or agent request to begin a data aggregation operation. In the illustrated embodiment, the request initiator 602 may be configured to operate on a desktop computing device, but this may not be required of all embodiments. In this example, the request initiator 602 is configured to transmit or otherwise send one or more structured documents 604 to a data processor 606.

The data processor 606 in this embodiment includes a network interface 608, a memory 610, and a processor 612. The network interface 608 is communicably coupled to the request initiator 602 and may be configured to convey information or data received from the request initiator 602—including the one or more structured documents 604—to the processor 612.

The data processor 606 is communicably coupled to a document processing pipeline that includes a rasterizer 614, an image pre-processor 616, a data extractor 618, a data validator 620, and a form populator 622.

In this example, the document processing pipeline is configured to normalize the processing and data extraction from a structured document regardless of the source of the document or the quality of the format in which the document is delivered. For example, the document processing pipeline of this embodiment may be configured to process, without limitation: rasterized documents, vector documents, image documents, video documents, and so on.

The rasterizer 614 of the document processing pipeline of the system 600 is configured to rasterize (e.g., digitize) structured documents received from the request initiator 602, including the one or more structured documents 604. As used herein, the phrase "structured document" generally refers to a document or form that is known to contain or recite specific information in a particular format or at a particular location. A structured document may be a receipt, a tax form, an income statement, a bank statement, a driver's license, a passport, and so on. As used herein, the phrase "unstructured document" generally refers to a document in which different data may be included in arbitrary locations or format.

The image pre-processor 616 of the document processing pipeline of the system 600 can receive the digitized and/or rasterized version of the structured document from the rasterizer 614. The image pre-processor 616 can perform any number of suitable document processing operations to the rasterized document including, but not limited to: deskewing, thresholding, binarisation, rotating, noise filtering, and so on. In some cases, the image pre-processor 616 may perform the same image processing operations on each document, whereas, in others, different operations or operation order may be applied to different detected or known document types, document formats, or document sources.

The data extractor 618 of the document processing pipeline of the system 600 can receive the pre-processed rasterized document from the image pre-processor 616 and can perform an optical character recognition operation to extract text information from the rasterized document. The data extractor 618 may also be configured to extract certain information from the text information. For example, the data extractor 618 may include one or more regular expression engines configured to match certain patterns of characters.

The data validator 620 of the document processing pipeline of the system 600 can receive the output of the data extractor 618 and may validate that data according to a validation definition (e.g., from a schema).

The form populator 622 of the document processing pipeline of the system 600 can receive validated data from the data validator 620 and, in turn, can populate one or more form fields displayed on the request initiator 602.

Figure 7:
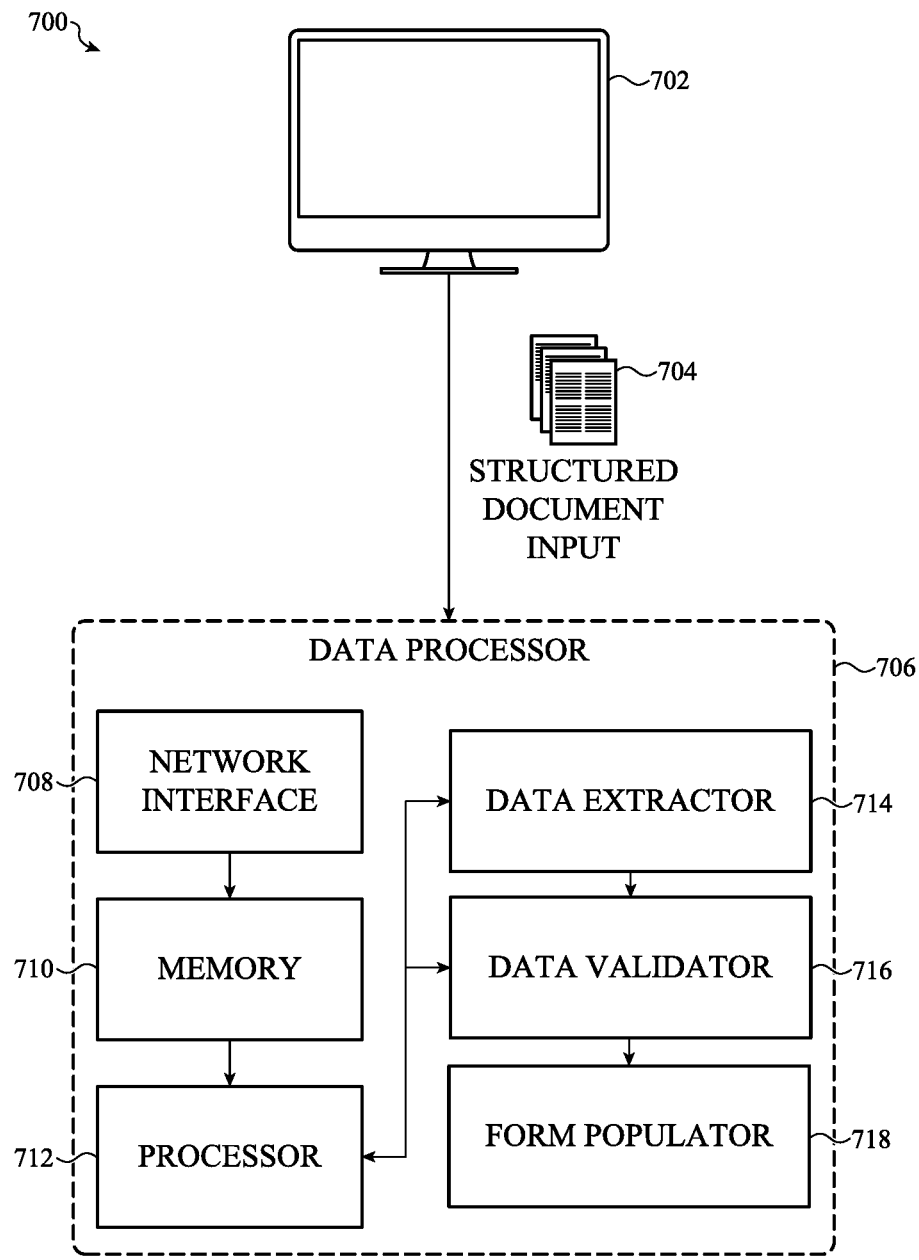
FIG. 7 is a simplified flow chart of a system for automatically restructuring data from a known source.

In other embodiments, a system such as described herein can be configured in another manner. For example, FIG. 7 is a simplified flow chart of a system for automatically processing structured data.

As with other embodiments described herein, the system 700 implements one or more components or functions of an automated data aggregation controller and/or a data distribution controller such as described herein. In particular, the system 700 is a portion of an automated data aggregation controller such as described herein that is configured to extract information structured documents in a known format. In some examples, the structured document may be a tax document and the unknown source may be: an object model, a plain-text document, a markup document, an instructor-standard format and so on.

As with other embodiments, the system 700 includes a request initiator 702 that receives an applicant or agent request to begin a data aggregation operation. In the illustrated embodiment, the request initiator 702 may be configured to operate on a desktop computing device, but this may not be required of all embodiments. In this example, the request initiator 702 is configured to transmit or otherwise send one or more structured documents 704 to a data processor 706.

As with other embodiments described herein, the data processor 706 in this embodiment includes a network interface 708, a memory 710, and a processor 712. The network interface 708 is communicably coupled to the request initiator 702 and may be configured to convey information or data received from the request initiator 702—including the one or more structured documents 704—to the processor 712.

The data processor 706 is communicably coupled to a document processing pipeline that includes a data extractor 714, a data validator 716, and a form populator 718.

The data extractor 714 of the document processing pipeline of the system 700 can receive one or more structured documents from the request initiator 702, including the one or more structured documents 704. The data extractor 714 is configured to extract information from the text information contained in the structured documents. For example, the data extractor 714 may include one or more regular expression engines configured to match certain patterns of characters. In another example, the data extractor 714 is configured to process a structured document based on one or more document tags or format headers.

The data validator 716 of the document processing pipeline of the system 700 can receive the output of the data extractor 714 and may validate that data according to a validation definition (e.g., from a schema).

The form populator 718 of the document processing pipeline of the system 700 can receive validated data from the data validator 716 and, in turn, can populate one or more form fields displayed on the request initiator 702.

Figure 8:
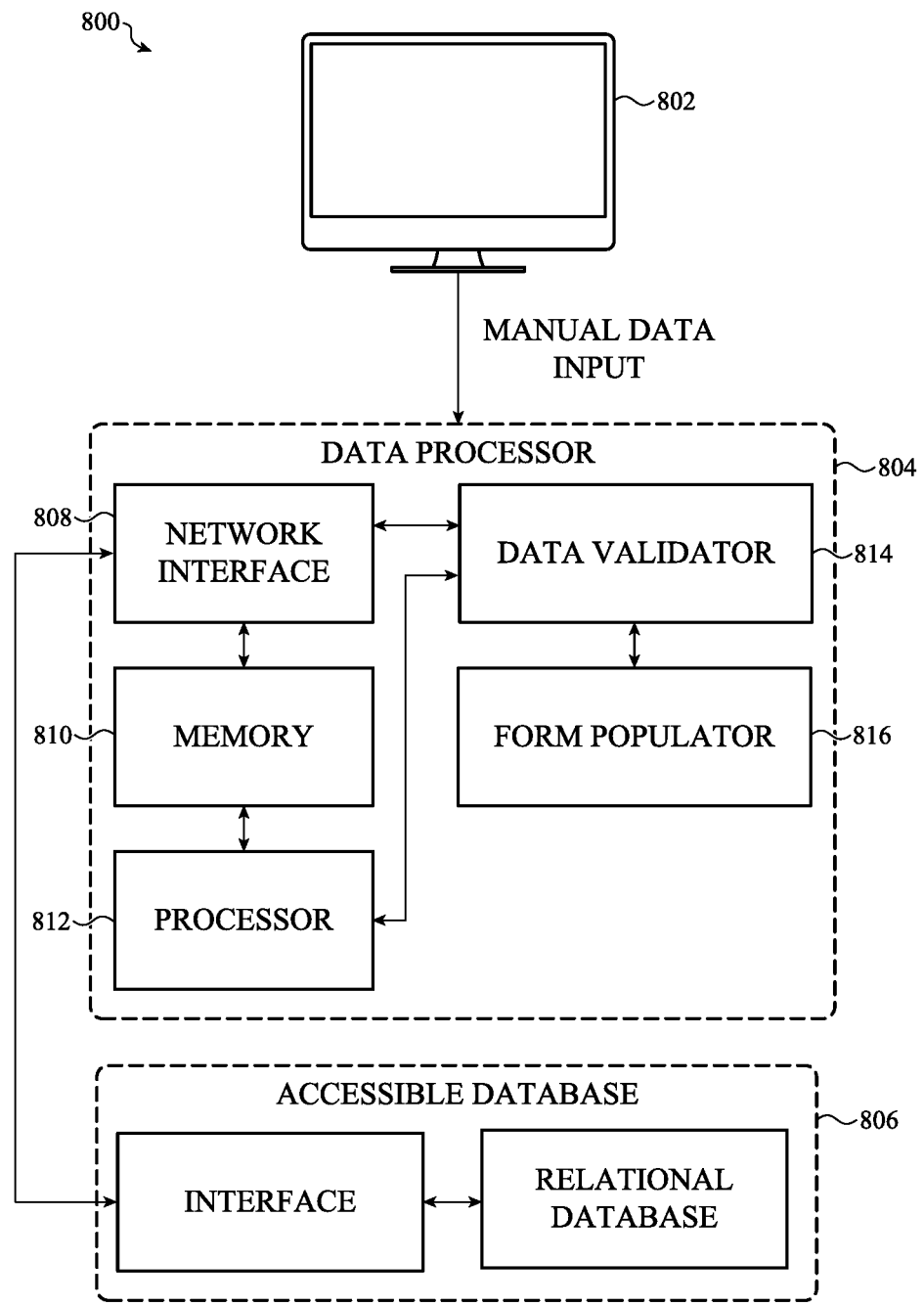
FIG. 8 is a simplified flow chart of a system for automatically validating manually-input data.

Still further embodiments can be implemented in a different manner. For example, FIG. 8 is a simplified flow chart of a system for automatically validating manually-input data.

As with other embodiments described herein, the system 800 implements one or more components or functions of an automated data aggregation controller and/or a data distribution controller such as described herein. In particular, the system 800 is a portion of an automated data aggregation controller such as described herein that is configured to extract information from manually input data.

As with other embodiments, the system 800 includes a request initiator 802 that receives an applicant or agent request to begin a data aggregation operation. In the illustrated embodiment, the request initiator 802 may be configured to operate on a desktop computing device, but this may not be required of all embodiments. In this example, the request initiator 802 is configured to transmit or otherwise send manually input data to a data processor 804 that in turn may be coupled to one or more accessible databases (first party or third party). The accessible databases are identified as the databases 806.

As with other embodiments described herein, the data processor 804 in this embodiment includes a network interface 808, a memory 810, and a processor 812. The network interface 808 is communicably coupled to the request initiator 802 and may be configured to convey information or data received from the request initiator 802 to the processor 812.

The data processor 804 is communicably coupled to a data processing pipeline that includes a data validator 814 and a form populator 816. As with other embodiments described herein, the data validator 814 of the data processing pipeline of the system 800 can receive the output of the data validator 814 and may validate that data according to a validation definition (e.g., from a schema). In this embodiment, the data validator 814 may also be configured to interface with the databases 806 in order to validate the manually input data.

The form populator 816 of the data processing pipeline of the system 800 can receive validated data from the data validator 814 and, in turn, can populate one or more form fields displayed on the request initiator 802.

The foregoing embodiments depicted in FIGS. 3-8 and the various alternatives thereof and variations thereto are presented, generally, for purposes of explanation, and to facilitate an understanding of various configurations of an automated data aggregation system, such as described herein. However, it will be apparent to one skilled in the art that some of the specific details presented herein may not be required in order to practice a particular described embodiment, or an equivalent thereof.

Still further embodiments reference methods of operating an automated data aggregation controller, a data distribution controller, and/or a system coordinator such as described herein.

Figure 9:
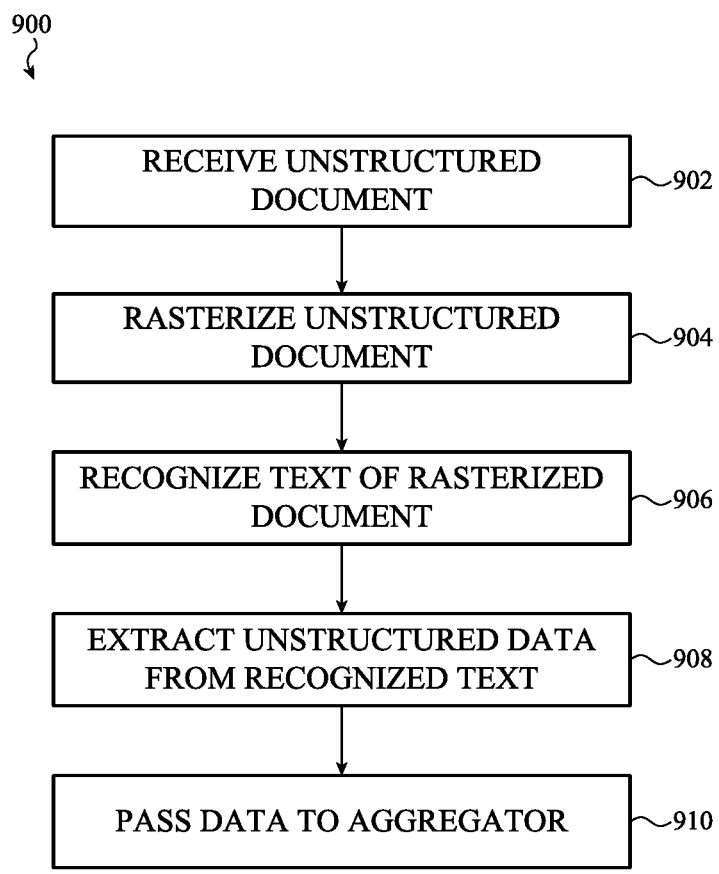
FIG. 9 is a flow chart diagram depicting example operations of a method of processing structured or unstructured data from an unknown source.

FIG. 9 is a flow chart diagram depicting example operations of a method of processing structured or unstructured data from an unknown source. The method depicted can be implemented and/or performed—in whole or in part—by any suitable electronic device, server device, or combination thereof (whether virtualized or physical). In many embodiments, the method is associated with an automated data aggregation controller, a data distribution controller, or a system coordinator (or a combination thereof) such as described herein.

The method 900 beings at operation 902 in which an unstructured document is received. Next, at operation 904, the unstructured document may be rasterized. The document may be rasterized regardless of whether a text layer is present in the unstructured document. Next at operation 906, text in the rasterized document may be recognized (e.g., optical character recognition operation). Next, at operation 908, data may be recognized and/or extracted from the text recognized from the rasterized document. Finally, at operation 910, the extracted data may be passed to a data aggregator, such as described herein.

Figure 10:
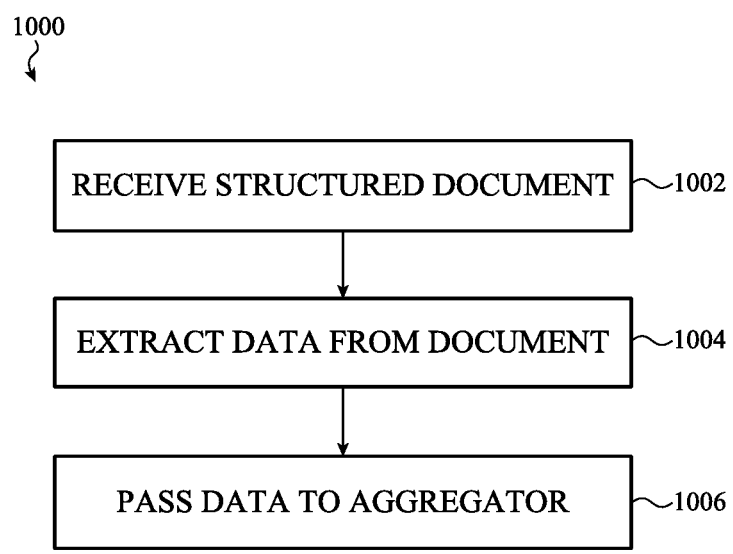
FIG. 10 is a flow chart diagram depicting example operations of a method of aggregating and processing structured data.

FIG. 10 is a flow chart diagram depicting example operations of a method of aggregating and processing structured data. The method depicted can be implemented and/or performed—in whole or in part—by any suitable electronic device, server device, or combination thereof (whether virtualized or physical). In many embodiments, the method is associated with an automated data aggregation controller, a data distribution controller, or a system coordinator (or a combination thereof) such as described herein.

The method 1000 beings at operation 1002 in which a structured document is received. At operation 1004, data is extracted from the structured document which may be an industry standard or otherwise specified format. In one embodiment, the structured document may include a document tree or byte stream that can inform the location of certain data. In other cases, data can be extracted in another manner (e.g., regular expressions). At operation 1006, the extracted data may be passed to a data aggregator, such as described herein.

Figure 11:
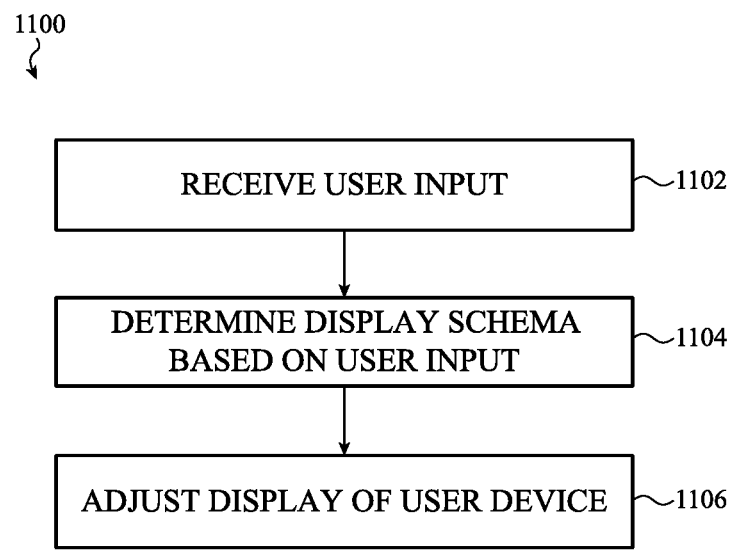
FIG. 11 is a flow chart diagram depicting example operations of a method of minimizing manual data input.

FIG. 11 is a flow chart diagram depicting example operations of a method of minimizing manual data input. The method depicted can be implemented and/or performed in whole or in part—by any suitable electronic device, server device, or combination thereof (whether virtualized or physical). In many embodiments, the method is associated with an automated data aggregation controller, a data distribution controller, or a system coordinator (or a combination thereof) such as described herein.

The method 1100 beings at operation 1102 in which user input is received. The user may be an applicant, an agent of the applicant, an employee of a company with which the applicant conducts business (e.g., bank), or any other suitable and authorized person. At operation 1104, a display schema—which may include validation definitions—can be determined based on the information received at operation 1102. Finally at operation 1106, a display of a user device can be updated based on the display schema.

Figure 12:
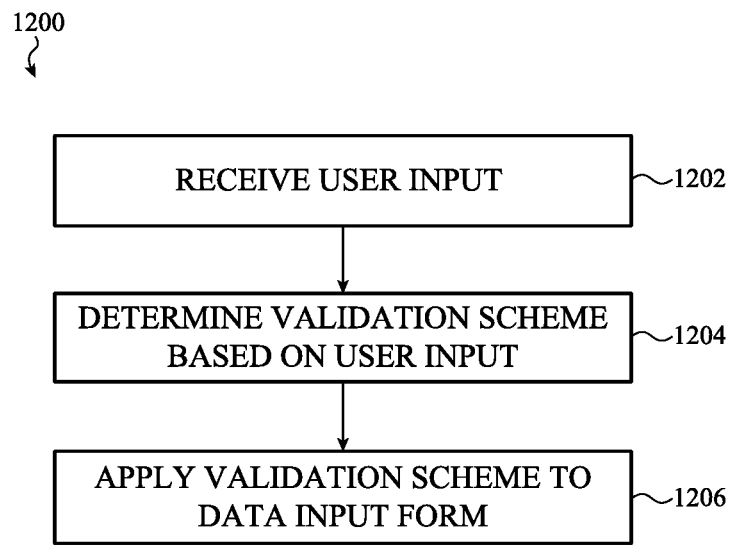
FIG. 12 is a flow chart diagram depicting example operations of a method of validating manually-input data.

FIG. 12 is a flow chart diagram depicting example operations of a method of validating manually-input data. The method depicted can be implemented and/or performed in whole or in part—by any suitable electronic device, server device, or combination thereof (whether virtualized or physical). In many embodiments, the method is associated with an automated data aggregation controller, a data distribution controller, or a system coordinator (or a combination thereof) such as described herein.

The method 1200 beings at operation 1202 in which user input is received. As with other embodiments, the user may be an applicant, an agent of the applicant, an employee of a company with which the applicant conducts business (e.g., bank), or any other suitable and authorized person. At operation 1204, a validation definition—which may be included in a schema received from a data distribution controller such as described herein—can be determined based on the information received at operation 1202. Finally at operation 1206, information or input provided by the user at operation 1202 can be validated according to the validation definition received at 1204.

Figure 13:
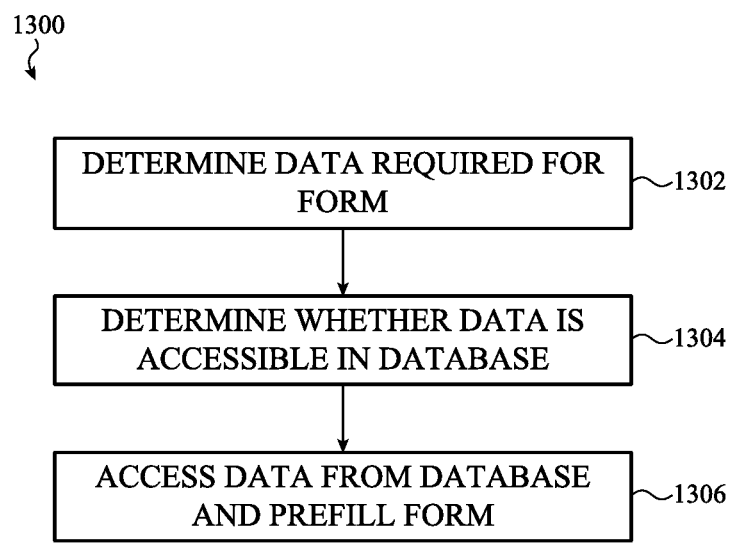
FIG. 13 is a flow chart diagram depicting example operations of a method of determining whether specific data may be acquired from a structured data source.

FIG. 13 is a flow chart diagram depicting example operations of a method of determining whether specific data may be acquired from a structured data source. The method depicted can be implemented and/or performed—in whole or in part—by any suitable electronic device, server device, or combination thereof (whether virtualized or physical). In many embodiments, the method is associated with an automated data aggregation controller, a data distribution controller, or a system coordinator (or a combination thereof) such as described herein.

The method 1300 beings at operation 1302 in which specific data required for a specific form is determined. In some cases, the data may be associated with several carriers each associated with a particular location and/or a particular insurance type. The specific data may be data required by all carriers, including common data and data uniquely required by only a single carrier. The data may include: name data, address data, answers to certain questions, financial data, income data, debt data, property ownership data, and so on.

Next, at operation 1304, the method can determine whether the data is obtainable from third-party databases. For example, name data and address data may be obtained from a third-party database (e.g., tax information database) whereas answers to certain questions may not be available via third-party or first-party databases.

Next, at operation 1306, data that is determined to be obtainable from one or more third-party databases can be obtained from those databases. Once data from those databases is retrieved, the data may be validated according to a validation definition. In some cases, the data may be used to prefill or automatically populate a form (e.g., application). In some cases, a single database is accessed to obtain specific information whereas, in other cases, redundant access may be used.

Figure 14:
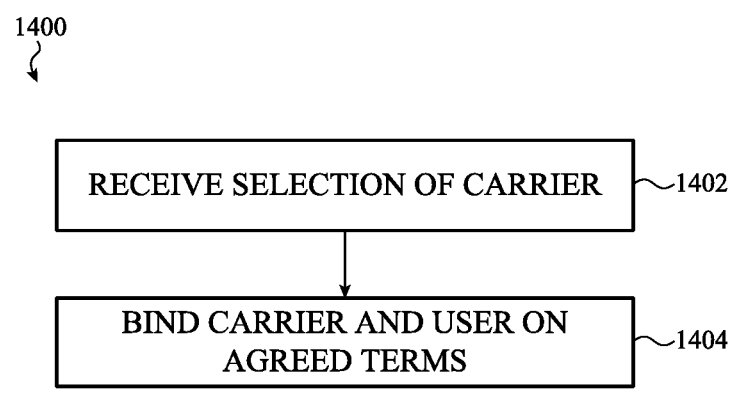
FIG. 14 is a flow chart diagram depicting example operations of a method of facilitating a binding transaction.

FIG. 14 is a flow chart diagram depicting example operations of a method of facilitating a binding transaction. The method depicted can be implemented and/or performed—in whole or in part—by any suitable electronic device, server device, or combination thereof (whether virtualized or physical). In many embodiments, the method is associated with an automated data aggregation controller, a data distribution controller, or a system coordinator (or a combination thereof) such as described herein.

The method 1400 begins at operation 1402 in which a policy of a particular carrier is selected. Thereafter, at operation 1404, an insurance transaction may be completed by binding the applicant and the carrier on the terms of the quote.

The foregoing embodiments depicted in FIGS. 9-14 and the various alternatives thereof and variations thereto are presented, generally, for purposes of explanation, and to facilitate an understanding of various methods for operating an automated data aggregation system, such as described herein. However, it will be apparent to one skilled in the art that some of the specific details presented herein may not be required in order to practice a particular described embodiment, or an equivalent thereof.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. A system for preventing over-disclosure of private information by a user by validating, and displaying at an end-user device, only that data which is required from the user and associated with a transaction, the transaction having a transaction type selected from a set of transaction types, the system comprising:
   a first server comprising a first processor and a first memory storing executable instructions that, when accessed by the first processor, instantiate a data distribution controller configured to:
      store and retrieve a plurality of data display schemas, the plurality of data display schemas comprising at least one data display schema associated with the selected transaction type, the at least one data display schema comprising a first set of rules, each rule comprising instructions for displaying or suppressing display of, at the end-user device, a respective one user input data type of a set of user input data types; and
      store and retrieve a plurality of data validation schemas, the plurality of data validation schemas comprising at least one data validation schema associated with the selected transaction type and comprising a second set of rules for automatically validating at least a subset of the set of user input data types, the subset associated with the selected transaction type and comprising the displayed user input data types as defined by the first set of rules;
      transmit normalized data to one or more third party systems; and
   a second server in communication with the first server, the second server comprising a second processor and a second memory storing executable instructions that, when accessed by the second processor, instantiate a data aggregation controller configured to:
      instruct the end-user device to render a graphical user interface to receive user input from a user of the end-user device;
      receive a signal comprising the selected transaction type from the end-user device;
      in response to receiving the signal from the end-user device, submit a query to the data distribution controller, the query comprising the selected transaction type;
      receive in response to the query, the at least one data validation schema from the data distribution controller;
      receive in response to the query the at least one data display schema from the data distribution controller;
      send the received at least one data validation schema and the received at least one data display schema to the end-user device, the at least one data display schema configured to cause the end-user device to:
         suppress display of at least one graphical user interface element associated with at least one user input data type of the set of user input data types; and
         display at least one graphical user interface element associated with the subset of the set of user input data types, input to each of the displayed graphical user interface elements configured to be validated by the end-user device according to the at least one data validation schema; and
      send, from the end-user device, the data validated by the end-user device according to the at least one validation schema to the data aggregation controller;
      receive a document as input to a displayed graphical user interface element;
      rasterize, by the data aggregation controller, the document;
      validate, by the data aggregation controller, data contained in the document based on the second set of rules; and
      transmit data validated by the second set of rules and data validated by the end-user device according to the at least one data validation schema to the data distribution controller as the normalized data to be transmitted to the one or more third party systems.

2. The system of claim 1, further comprising the end-user device; wherein:
   in response the receiving the at least one data validation schema from the second server, the end-user device is configured to adjust a display of the end-user device based on each received data validation schema.

3. The system of claim 1, wherein at least one data validation schema of the plurality of data validation schemas comprises a third set of rules for formatting, prior to validation, at least one user input data type of the set of user input data types.

4. The system of claim 1, further comprising the end-user device; wherein
   in response the receiving the at least one data display schema from the second server, the end-user device is configured to adjust a display of the end-user device based on each received data display schema.

* * * * *